June 28, 1966 J. E. NIXON ETAL 3,257,966
GRIP FOR CONVEYOR SYSTEM LINE
Filed July 14, 1964 2 Sheets-Sheet 1

June 28, 1966  J. E. NIXON ETAL  3,257,966
GRIP FOR CONVEYOR SYSTEM LINE
Filed July 14, 1964  2 Sheets-Sheet 2
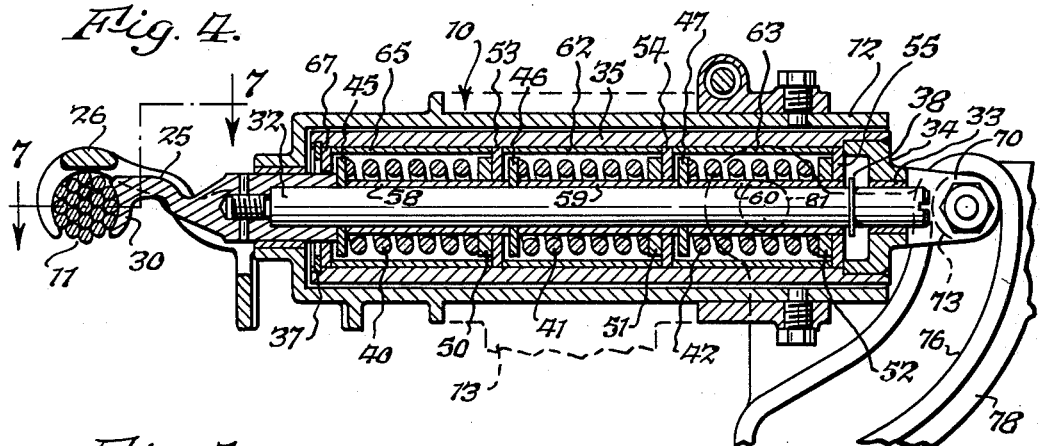
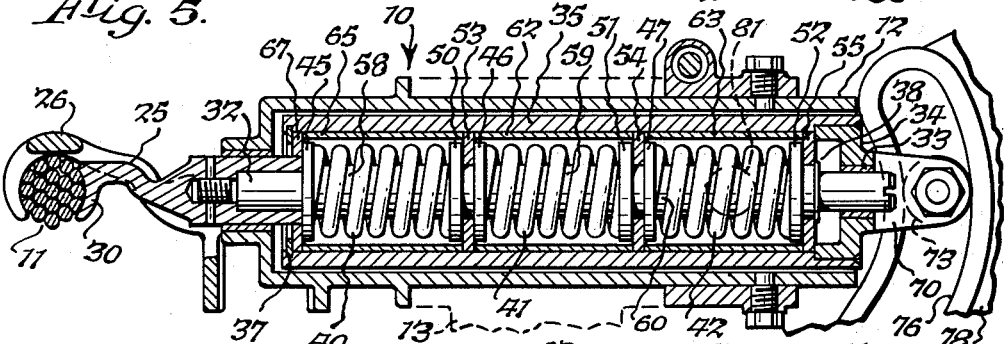
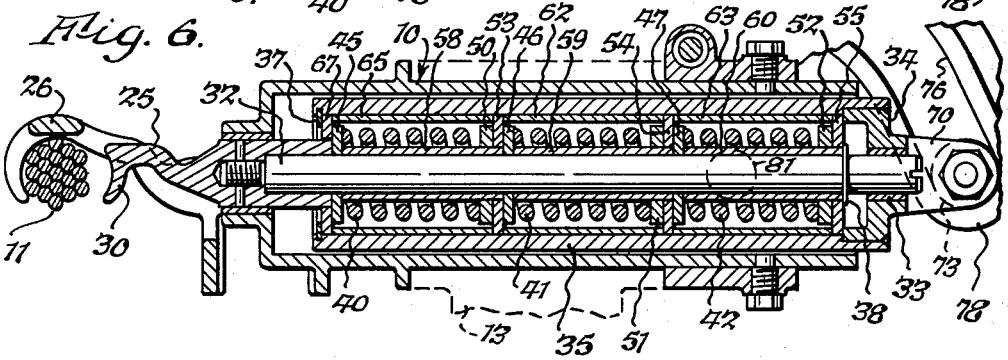
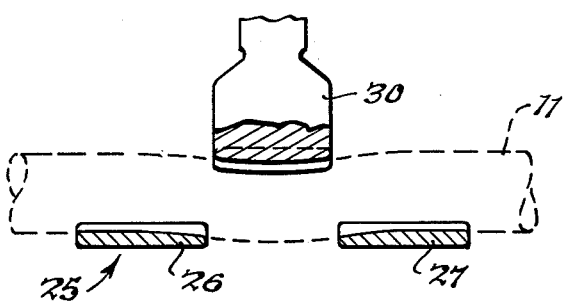

United States Patent Office 3,257,966
Patented June 28, 1966

3,257,966
GRIP FOR CONVEYOR SYSTEM LINE
John E. Nixon, Box 435, R.D. 1, Langhorn, Pa., and
Robert E. Kinney, 7 Birch Ave., Pennington, N.J.
Filed July 14, 1964, Ser. No. 382,576
10 Claims. (Cl. 104—205)

This invention relates to a line or cable conveyor system and more particularly to an arrangement for attaching a load to the line for the purpose of supporting or hauling the load or both.

Conveyor systems of the type to which the present invention is directed, while of general application, are particularly well suited for transporting a load between two or more terminals through the use of a continuously moving line or cable. Such systems are useful in connection with cable cars, chair lifts, etc., to transport passengers, often over extremely difficult terrain, and also for industrial applications, for example, to convey various other loads. In systems of this type, it is important to provide a firm and positive grip on the line as the load is transported between the terminals.

Heretofore, difficulties have been encountered in the attachment of a load to a continuously moving conveyor line. For example, many of the gripping mechanisms previously employed for this purpose produced inadequate gripping pressure particularly in cases in which the portion of the line being gripped was of a slightly smaller diameter than that for which the grip was designed. In addition, such prior gripping mechanisms often permitted unwanted slippage between the grip and the line, because of random vibrations, etc., and this has been of special moment in cases in which the line was advanced over its supporting sheaves at a comparatively rapid rate. Moreover, the repeated release and regripping of the line at the terminals further impaired the desired gripping action.

One general object of this invention, therefore, is to provide a new and improved arrangement for attaching a load to a conveyor line.

More specifically, it is an object of this invention to provide a gripping mechanism for firmly securing the load to the line wherein the pressure exerted by the grip on the line is substantially unaffected by minor variations in the line diameter.

Another object of this invention is the provision of a gripping mechanism of the character indicated which exhibits uniform gripping pressure irrespective of random vibrations which may occur in the conveyor system.

A further object of the invention is to provide such mechanism which greatly facilitates the release and regripping of the line at the terminals of the system.

Still another object of the invention is to provide a novel grip utilizing comparatively simple mechanical components which is economical to manufacture and thoroughly reliable in operation.

In one illustrative embodiment of the invention, there is provided a grip for a conveyor line which includes a load supporting housing in juxtaposition with the line. The housing carries a hook member overlying the line and this hook member cooperates with a line-engaging jaw which is slidably mounted within the housing to alternately clamp and release the line. As the jaw is advanced relative to the housing toward its clamping position, it contacts the line and is urged into positive gripping engagement to firmly maintain the line between the jaw and the hook member.

In accordance with one feature of the invention, the movement of the line-engaging jaw is controlled by unique control means which is positioned within the housing and is movable with respect to both the housing and the jaw. The control means preferably includes a sleeve which is effective to carry the jaw into engagement with the line to provide firm gripping action irrespective of the line diameter.

In accordance with another feature of the invention, in several particularly advantageous embodiments, there is provided a resilient connection between the control means and the jaw which urges the jaw into clamping engagement with the line under constant pressure and is effective to absorb any vibrations which might otherwise adversely affect the gripping action.

In accordance with a further feature of the invention, in certain good arrangements, the resilient connection between the control means and the jaw comprises a plurality of coil springs which are coaxially supported within the housing. To grip the line, the control means and the jaw are initially moved together toward the line until the jaw comes in contact therewith. Upon continued movement of the control means, the jaw remains substantially stationary and is biased by the springs into resilient clamping engagement with the line. With this arrangement, the grip is firmly secured to the line, while the force needed to operate the jaw is maintained at a minimum.

In accordance with still another feature of certain embodiments of the invention, there is provided unique operating means for moving the control means between its various positions. During the conveying operation, the operating means is affirmatively locked in position to prevent the inadvertent release of the line. At the terminals, however, both the operating means and the locking means are automatically controlled to enable the release of the line.

The present invention, as well as further objects and features thereof, will be understood more clearly and fully from the following description of certain preferred embodiments, when read with reference to the accompanying drawings, in which:

FIGURE 4 is an enlarged sectional view taken along the line 4—4 in FIGURE 1, with certain parts shown in elevation and other omitted for purposes of clarity;

FIGURE 5 is an enlarged sectional view in general similar to FIGURE 4 but showing portions of the grip in different positions;

FIGURE 6 is an enlarged sectional view similar to FIGURES 4 and 5 but showing portions of the grip in still other positions; and FIGURE 7 is a sectional view taken generally along the line 7—7 in FIGURE 4, with the conveyor line indicated by dotted lines.

Figure 1:
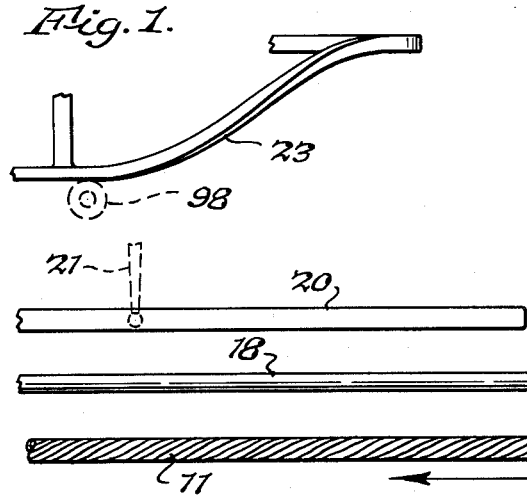
FIGURE 1 is a partially schematic plan view of a gripping mechanism for a conveyor system in accordance with one illustrative embodiment of the invention, together with a conveyor line and cooperating portions of a terminal.
Figure 2:
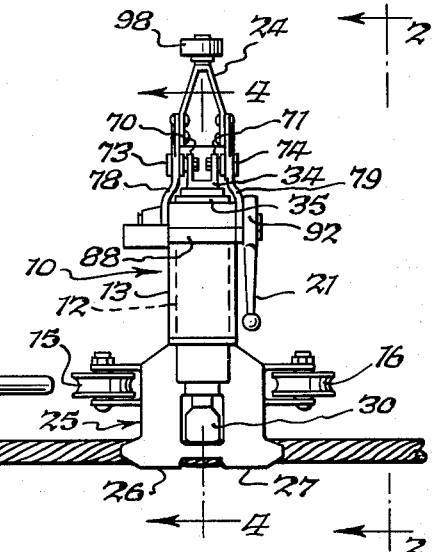
FIGURE 2 is an enlarged side elevational view of the gripping mechanism and associated components as seen from the line 2—2 in FIGURE 1.
Figure 2:
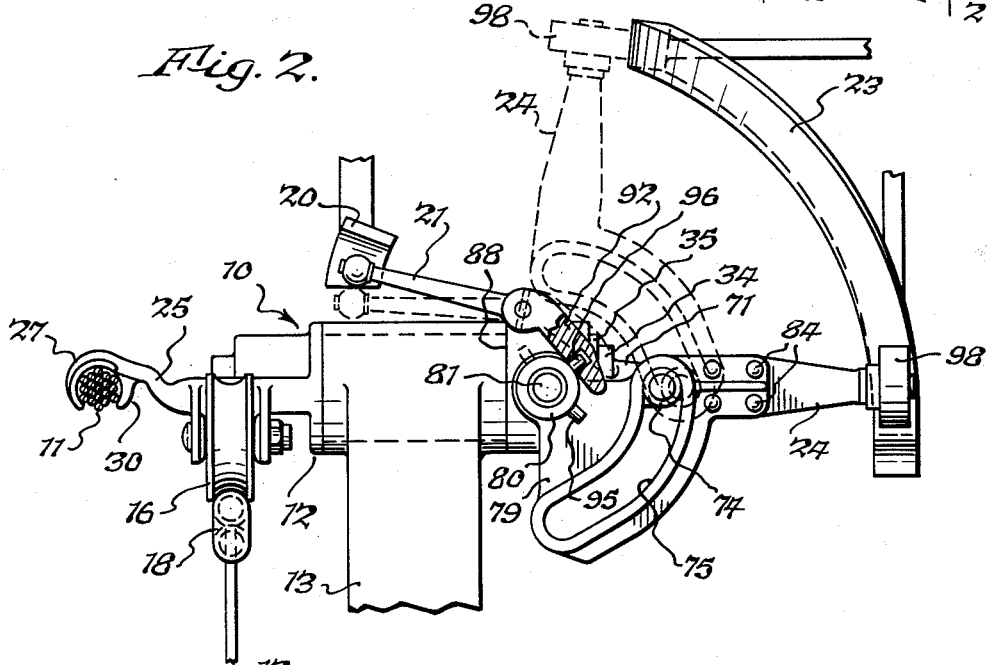
Figure 3:
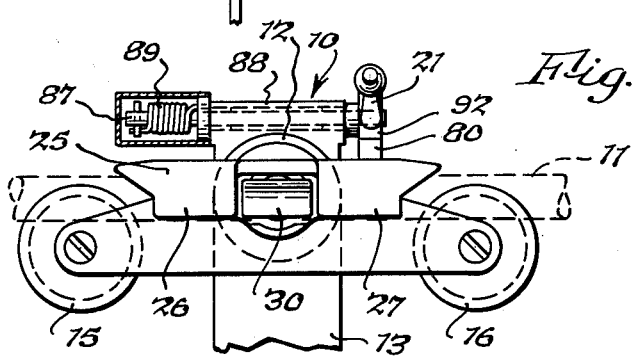
FIGURE 3 is an end elevational view of the grip as seen from the left of FIGURE 2, with the conveyor line indicated in dotted lines and with a portion of the grip broken away to show internal structure.

Referring to the drawings in detail, and particularly to FIGURES 1–3, there is shown a gripping mechanism 10 which is arranged to alternately clamp and release a conveyor line or cable 11. The mechanism 10 includes an elongated generally cylindrical housing 12 which extends in a lateral direction with respect to the cable 11 and supports a hanger 13 for the load to be carried. The cable 11 is arranged for continuous movement at a constant speed along a closed path in the direction of the arrow in FIGURE 1 to transport the load between two or more stations or terminals.

As the gripping mechanism 10 approaches a terminal, two pulleys 15 and 16 carried by the housing 12 ride onto a terminal support rail 18. Thereafter, a lock cam track 20 at the terminal engages a locking lever 21 on the mechanism 10 to condition the apparatus for the release of the line 11. The mechanism then approaches a grip cam track 23 which produces pivotal movement of an operating lever 24 in a direction to detach the mechanism from the line, thereby permitting the load to come to a stop. Movement of the lever 24 in the opposite direction again secures the mechanism to the line, and the lever 24 is locked in position by the lever 21 prior to the time the load leaves the terminal.

The cylindrical housing 12 is arranged in jutaposition with the cable 11 and extends in a generally horizontal direction at a right angle with respect thereto. The end of the housing 12 remote from the cable 11 is open, while the housing end adjacent the cable is partially closed and supports a hook member 25. As best shown in FIGURES 1 and 3, the member 25 is bifurcated to form two generally C-shaped portions 26 and 27 which overlie the cable 11 and provide sufficient clearance beneath the cable for suitable sheaves (not shown) or other cable supporting means.

A reciprocably movable jaw 30 cooperates with the portions 26 and 27 of the hook member 25 to alternately clamp and release the cable 11. The jaw 30 is affixed to one end of a shaft 32 (FIGURES 4–6) which forms a portion of the jaw assembly and is slidably supported within the housing 12 in coaxial relationship therewith. The opposite end of the shaft 32 protrudes through the adjacent open end of the housing 12 and is slidably disposed in a bearing sleeve 33. This sleeve is mounted in a generally cup-shaped plate 34 which is reciprocably carried in the open housing end.

An elongated control sleeve 35 is coaxially positioned within the housing 12. The sleeve 35 is of a length substantially equal to that of the housing and is arranged for sliding movement with respect thereto and also with respect to the jaw shaft 32. The end of the sleeve 35 adjacent the open end of the housing is affixed to the periphery of the cup-shaped plate 34, while the opposite end of the sleeve is provided with a circular retaining ring 37. The sleeve 35 and the shaft 32 are resiliently interconnected by three coil springs 40, 41 and 42. The springs 40, 41 and 42 are disposed within the housing in coaxial relationship with each other and extend around the shaft 32 between the plate 34 and the retaining ring 37.

The coil springs 40, 41, 42 are interposed between the control sleeve 35 and the jaw shaft 32 to maintain the jaw 30 and the sleeve 35 in predetermined sliding relationship with each other. The springs 40, 41 and 42 provide three separate parallel connections between the sleeve 35 and the shaft 32. That is, the left end of each of the springs 40, 41 and 42, as viewed in FIGURES 4–6, is maintained in fixed relationship with the shaft 32, while the right end of each spring is in fixed relationship with the sleeve 35. Three ring-shaped members 45, 46 and 47 are rigidly affixed to the shaft 32 in spaced relationship with each other, and the left ends of the springs 40, 41 and 42 respectively bear against these members. The right ends of the springs 40, 41 and 42 bear against corresponding shims 50, 51 and 52 which are in facing engagement with ring-shaped members 53, 54 and 55 affixed to the inner cylindrical surface of the sleeve 35. The shims 50, 51 and 52 and the ring-shaped members 53, 54 and 55 are slidably disposed with respect to the shaft 32.

The spacing between the ring-shaped members 45, 46 and 47 is maintained by two inner sleeves 58 and 59. These sleeves surround the portions of the shaft 32 within the springs 40 and 41. The portion of the shaft within the spring 42 is surrounded by an inner sleeve 60 which is held in place between the member 47 and a retaining ring 38 disposed around the shaft adjacent the plate 34.

In a similar manner, the ring-shaped members 53, 54 and 55 are spaced apart by two outer sleeves 62 and 63 which are disposed around the springs 41 and 42. A third outer sleeve 65 extends around the spring 40 between the ring-shaped member 53 and an outer end ring 67 which is connected to the control sleeve 35 immediately adjacent the retaining ring 37.

The arrangement is such that the left end of each of the coil springs 40, 41 and 42 is movable with the assembly comprising the ring-shaped members 45, 46 and 47, the inner sleeves 58, 59 and 60, the elongated shaft 32 and the jaw 30. The right end of each spring, on the other hand, moves with the assembly including the shims 50, 51 and 52, the ring-shaped members 53, 54 and 55 and 67, the outer sleeves 62, 63 and 65, the control sleeve 35, the retaining ring 37 and the cup-shaped plate 34. These assemblies are slidably disposed with respect to each other and also with respect to the housing 12. Because of the arrangement of the springs 40, 41 and 42 in parallel between the jaw assembly and the control sleeve assembly, should one or even two of the springs fail the connection is maintained by the remaining spring to provide the desired gripping action. The springs preferably are precompressed between their corresponding ring-shaped members to provide a total preload condition which illustratively is of the order of 3900 pounds when the jaw 30 is in its fully open (FIGURE 6) position.

The assembly including the control sleeve 35 is reciprocably movable within the housing 12 in response to movement of the operating lever 24 (FIGURE 1). The cup-shaped plate 34 of this assembly is provided with two integrally formed extensions 70 and 71 which protrude from the end of the housing 12 opposite that adjacent the cable 11. The extensions 70 and 71 respectively include cam followers 73 and 74 which ride within corresponding cam tracks 75 and 76. As best shown in FIGURE 2, the cam tracks 75 and 76 are of generally arcuate configuration and are formed on wedge-shaped plates 78 and 79, respectively, which are arranged for movement in vertical planes on opposite sides of the housing 12. Each of these plates includes a hub 80 which is disposed around a pin 81 protruding from the housing 12 to permit pivotal movement of the plates about an axis parallel to the cable 11. The plates are suitably secured to the operating lever 24, as by machine screws 84, and are arranged to pivot about the axis of the pins 81 through an angle of approximately ninety degrees between the position shown in full lines in FIGURE 2 (the closed position of the grip) and the dotted line position (the open position). Movement of the plates beyond these positions is prevented by the curved ends of the cam tracks 75 and 76.

The operating lever 24 and its attached plates 78 and 79 are maintained in either the grip-open or the grip-closed position by the locking lever 21. The lever 21 protrudes from the upper portion of the housing 12 and is connected at its inner end to one end of a rock shaft 87 (FIGURE 3). This shaft extends in a direction parallel to the cable 11 and is pivotally supported by a trunnion assembly 88 which overlies the housing 12. The end of the shaft 87 opposite that affixed to the lever 21 is connected to a coil spring 89 which biases the lever in a clockwise direction, as viewed in FIGURE 2, toward its locked position.

An arm 92 is movable with the locking lever 21 and extends from the shaft 87 toward the adjacent hub 81 for the cam plate 79. The arm 92 is provided with a suitable recess which mates with one of two pins 95 and 96 on the hub 81. These pins protrude radially from the hub at approximately a right angle with respect to each other and prevent pivotal movement of the hub, and hence the operating lever 24, during the time either pin is disposed within the recess in the arm 92.

In the closed position of the gripping mechanism 10, the pin 95 is disposed within the recess in the arm 92 and is resiliently maintained in this position by the action of the biasing spring 89. The operating lever 24 and the cam plates 78 and 79 are thereby locked in their full line (FIGURE 2) positions with the lever 24 extending outwardly in a longitudinal direction with respect to the housing 12 and the cam followers 73 and 74 in engagement with the upper portions of the corresponding tracks 75 and 76. The followers 73 and 74 are firmly held by these tracks in their extreme left positions, as shown in FIGURE 4, to lock the jaw 30 in clamping engagement with the cable 11.

As the grip 10 approaches the terminal and rides onto the terminal support rail 18 (FIGURE 1), the cam track 20 engages the outer end of the locking lever 21 and pivots the lever in a counterclockwise direction, as viewed in FIGURE 2, through a small angle. The pivotal movement of the lever 21 produces similar movement of the shaft 87 and the arm 92 against the resistance of the coil spring 89 to carry the arm into spaced relationship with the pin 95. The wedge-shaped plates 78 and 79 and the operating lever 24 are thereby unlocked to permit the release of the cable 11 by the grip.

Upon the unlocking of the operating lever 24, a roller 98 thereon engages the cam track 23. The configuration of the track 23 is such that the lever 24 and the attached plates 78 and 79 pivot about the axis of the hubs 80 through an angle of approximately ninety degrees. During this movement, the cam tracks 75 and 76 on the plates 78 and 79 urge the followers 73 and 74 away from the cable 11 in an axial direction with respect to the housing 12. The cup-shaped plate 34, the control sleeve 35, the retaining ring 37, the ring-shaped members 53, 54, 55 and 67, the shims 50, 51 and 52 and the sleeves 62, 63 and 65 similarly move in an axial direction from the positions shown in FIGURE 4 to those shown in FIGURE 6.

However, during the initial portion of the movement of these components, that is, as the control sleeve 35 moves from its FIGURE 4 position to its FIGURE 5 position, the jaw 30, the shaft 32, the ring-shaped members 45, 46 and 47 and the sleeves 58, 59 and 60 remain substantially stationary with respect to the housing 12. The coil springs 40, 41 and 42 expand and continue to act on the members 45, 46 and 47 with sufficient force to urge the jaw 30 against the cable 11.

Upon the continued movement of the operating lever 24 to carry the control sleeve 35 from the position shown in FIGURE 5 to that shown in FIGURE 6, the ring-shaped members 53, 54 and 67 affixed to the sleeve 35 respectively engage the ring-shaped members 45, 46 and 47 on the jaw shaft 32. The jaw 30 thereby moves with the sleeve 35 away from the cable 11 to its fully open position, thus permitting slippage between the cable and the C-shaped portions 26 and 27 of the hook member 25 to release the cable and permit the grip and its attached load to come to rest. As the operating lever approaches its fully open position, the pin 96 on the hub 80 engages the arm 92 and slides into the recess in the arm, thereby locking the operating lever in place.

To operate the grip to again clamp the cable 11 between the movable jaw 30 and the C-shaped portions 26 and 27 of the hook member 25, the locking lever 21 is moved in a counterclockwise direction, as viewed in FIGURE 2, to raise the arm 92 away from the pin 96 and thereby release the operating lever 24. The lever 24 is then pivoted clockwise, as viewed in this figure, about the axis of the hubs 80 from its dotted line position to its full line position. As the lever 24 pivots about the hub axis, the cam followers 73 and 74 are urged by the tracks 75 and 76 toward the cable 11, thereby moving the cup-shaped plate 34, the control sleeve 35 and associated parts from the position shown in FIGURE 6 to that shown in FIGURE 4. During the initial portion of this movement, the compression in the coil springs 40, 41 and 42 remains substantially the same, and the shaft 32 and the jaw 30 move with the sleeve 35 because of the engagement between the ring-shaped members 45, 46 and 47 and the ring-shapd members 53, 54 and 67, respectively.

At the time the jaw 30 comes in contact with the cable 11, the resistance to movement of the jaw and its attached shaft 32 increases, and the jaw remains substantially stationary with respect to the cable. The control sleeve 35, however, continues its movement toward the cable against the resistance of the coil springs 40, 41 and 42. The total compression in the springs 40, 41 and 42 is increased, and the springs act on the jaw 30 to resiliently urge it against the cable under a constant pressure which is substantially independent of small variations in the cable diameter. As the jaw reaches its fully closed position, the cable is deflected slightly in the manner shown in FIGURE 7 to provide an extremely strong and firm grip. In this position, the total compression in the coil springs illustratively is of the order of 4500 pounds. The jaw is resiliently locked in place by the action of the locking lever 21.

The pressure exerted by the jaw 30 on the cable 11 is determined primarily by the initial compression of the coil springs 40, 41 and 42 and the dimensions of the various components of the gripping mechanism. This pressure is substantially unaffected by minor variations in the diameter of the cable or by random vibrations which might result as the cable rides over its supporting sheaves, for example. In addition, the arrangement of the control sleeve 35 and associated components is such that very little force is required to close the grip until the jaw 30 contacts the cable. The jaw is then resiliently urged against the cable by the coil springs under high pressure to provide positive gripping action.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A grip for a moving conveyor line comprising, in combination, a housing member extending at substantially a right angle with respect to said line, hook means affixed to said housing member and overlying said line, a line-engaging jaw reciprocably movable with respect to said housing member toward and away from said line, said jaw cooperating with said hook means to alternately clamp and release said line, control means slidably disposed within said housing member for movement toward and away from said line between an open position and a closed position, means interposed between said jaw and said control means for maintaining the same in predetermined sliding relationship with each other, and operating means for sliding said control means with respect to said housing between said open position and said closed position, said jaw moving with said control means during the initial portion of the movement thereof toward said closed position but said jaw remaining substantially stationary during the subsequent portion of said movement, to thereby move said jaw into engagement with said line and clamp the same between said jaw and said hook means.

2. A grip for a moving conveyor line comprising, in combination, a housing member in juxtaposition with said line, hook means mounted on said housing member and overlying said line, means including a control sleeve slidably carried within said housing member for movement toward and away from said line between an open position and a closed position, a line-engaging jaw having a portion disposed within said sleeve for reciprocable movement with respect thereto, said jaw cooperating with said hook means to alternately clamp and release said line, means interposed between said jaw portion and said control sleeve for maintaining the same in predetermined sliding relationship with each other, and operating means for moving said control sleeve between said open position and said closed position, said jaw moving with said control sleeve during the initial portion of the movement thereof toward said closed position but said jaw engaging said line and remaining substantially stationary during the subsequent portion of said movement, to thereby clamp said line between said jaw and said hook means.

3. In a conveyor system having a moving conveyor line, a grip for said line which comprises an elongated housing member extending at substantially a right angle with respect to said line, hook means affixed to said housing member and overlying said line, means including a control sleeve slidably carried within said housing member for movement toward and away from said line between an open position and a closed position, a line-engaging jaw having a portion disposed within said sleeve for reciprocable movement with respect thereto, said jaw cooperating with said hook means to alternately clamp and release said line, means interposed between said jaw portion and said control sleeve for maintaining the same in predetermined sliding relationship with each other, and operating means including a lever pivotally carried by said housing member in position to act on the end of said control sleeve remote from said line for moving said sleeve between said open position and said closed position, said jaw moving with said sleeve during the initial portion of the movement thereof toward said closed position but said jaw engaging said line and remaining substantially stationary during the subsequent portion of said movement, to thereby clamp said line between said jaw and said hook means.

4. A grip for a moving conveyor line comprising, in combination, an elongated housing member extending at substantially a right angle with respect to said line, hook means affixed to said housing member and overlying said line, control means carried within said housing member for movement toward and away from said line between an open position and a closed position, a line-engaging jaw having a portion disposed within said housing member for reciprocable movement with respect thereto, said jaw cooperating with said hook means to alternately clamp and release said line, means including a plurality of coil springs interposed between said jaw and said control means for maintaining the same in resilient sliding relationship with each other, and operating means for moving said control means between said open position and said closed position, said jaw moving with said control means during the initial portion of the movement thereof toward said closed position but said jaw engaging said line and remaining substantially stationary during the subsequent portion of said movement, to thereby clamp said line between said jaw and said hook means.

5. In a conveyor system having a moving conveyor line, a grip for said line which comprises an elongated housing member extending at substantially a right angle with respect to said line, hook means mounted on said housing member and overlying said line, means including a control sleeve slidably carried within said housing member for movement toward and away from said line between an open position and a closed position, a line-engaging jaw having a portion disposed within said control sleeve for reciprocable movement with respect thereto, said jaw cooperating with said hook means to alternately clamp and release said line, means including a plurality of coil springs in coaxial relationship with each other and with said control sleeve for resiliently interconnecting said jaw portion and said sleeve, and operating means for moving said control sleeve between said open position and said closed position, said jaw moving with said sleeve during the initial portion of the movement thereof toward said closed position but said jaw engaging said line and remaining substantially stationary during the subsequent portion of said movement, to thereby clamp said line between said jaw and said hook means.

6. In a conveyor system having a moving conveyor line, a grip for said line which comprises an elongated housing member in juxtaposition with said line, hook means affixed to said housing member and overlying said line, means including a control sleeve slidably carried within said housing member for movement toward and away from said line between an open position and a closed position, a line-engaging jaw having a portion disposed within said control sleeve for reciprocable movement with respect thereto, said jaw cooperating with said hook means to alternately clamp and release said line, means including at least one coil spring in coaxial relationship with said control sleeve for maintaining said sleeve and said jaw portion in resilient sliding relationship with each other, operating means for moving said control sleeve between said open position and said closed position, said jaw moving with said sleeve during the initial portion of the movement thereof toward said closed position but said jaw engaging said line and remaining substantially stationary during the subsequent portion of said movement, said jaw being maintained in clamping engagement with said line by the action of said coil spring, and locking means cooperating with said operating means for holding said control sleeve in said closed position, to thereby lock said jaw in said clamping engagement.

7. In a conveyor system having a moving conveyor line, a grip for said line which comprises an elongated housing member extending at substantially a right angle with respect to said line, hook means affixed to said housing member and overlying said line, means including a control sleeve slidably carried within said housing member for movement toward and away from said line between an open position and a closed position, a line-engaging jaw having a portion disposed within said control sleeve for reciprocable movement with respect thereto, said jaw cooperating with said hook means to alternately clamp and release said line, means including at least one coil spring disposed within said housing member in coaxial relationship with said control sleeve for maintaining said sleeve and said jaw portion in resilient sliding relationship with each other, operating means including a lever pivotally carried by said housing member in position to act on the end of said control sleeve remote from said line for moving said sleeve between said open position and said closed position, said jaw moving with said sleeve during the initial portion of the movement thereof toward said closed position but said jaw engaging said line and remaining substantially stationary during the subsequent portion of said movement, said jaw being maintained in clamping engagement with said line by the action of said coil spring, and locking means cooperating with said operating means for holding said control sleeve in said closed position, to thereby lock said jaw in said clamping engagement.

8. In a conveyor system having a moving conveyor line, a grip for said line which comprises an elongated housing member extending at substantially a right angle with respect to said line, hook means affixed to said housing member and overlying said line, means including a control sleeve slidably carried within said housing member for movement toward and away from said line between an open position and a closed position, a line-engaging jaw having a portion disposed within said control sleeve for reciprocable movement with respect thereto, said jaw cooperating with said hook means to alternately clamp and release said line, means including a plurality of coil springs in coaxial relationship with each other and with said control sleeve for maintaining said sleeve and said jaw portion in resilient sliding relationship with each other, operating means including a lever pivotally carried by said housing member in position to act on the end of said control sleeve remote from said line for moving said sleeve between said open position and said closed position, said jaw moving with said sleeve during the initial portion of the movement thereof toward said closed position but said jaw engaging said line and remaining substantially stationary during the subsequent portion of said movement, said jaw being maintained in clamping engagement with said line by the action of each of said coil springs, and locking means cooperating with said operating means for holding said control sleeve in said closed position, to thereby lock said jaw in said clamping engagement.

9. In a conveyor system of the character set forth in claim 8, said locking means being arranged to cooperate with said operating means to lock said control sleeve in said open position, to prevent the inadvertent clamping of said line.

10. In a conveyor system having a moving conveyor line, a grip for said line which comprises an elongated generally cylindrical housing member extending at substantially a right angle with respect to said line, hook means affixed to said housing member and overlying said line, means including a control sleeve slidably carried within said housing member for movement toward and away from said line between an open position and a closed position, a line-engaging jaw having a portion disposed within said sleeve for reciprocable movement with respect thereto, said jaw cooperating with said hook means to alternately clamp and release said line, means including a plurality of precompressed coil springs disposed within said housing member in coaxial relationship with each other and with said control sleeve for maintaining said sleeve and said jaw portion in resilient sliding relationship with each other, one end of each of said coil springs acting on said sleeve and the other end acting on said jaw portion to provide separate parallel interconnections therebetween, operating means including a lever pivotally carried by said housing member in position to act on the end of said control sleeve remote from said line for moving said sleeve between said open position and said closed position, said jaw moving with said sleeve during the initial portion of the movement thereof toward said closed position but said jaw engaging said line and remaining substantially stationary during the subsequent portion of said movement, said jaw being maintained in clamping engagement with said line by the action of each of said coil springs, and locking means resiliently cooperating with said operating means for holding said control sleeve in said closed position, to thereby lock said jaw in said clamping engagement.

References Cited by the Examiner

UNITED STATES PATENTS 1,714,625   5/1929   Reilly _____ 104—205

ARTHUR L. LA POINT, *Primary Examiner.*

F. W. MONAGHAN, *Assistant Examiner.*